US008348148B2

(12) United States Patent
Acosta-Cazaubon

(10) Patent No.: US 8,348,148 B2
(45) Date of Patent: Jan. 8, 2013

(54) METERING INFRASTRUCTURE SMART CARDS

(75) Inventor: Jesus Acosta-Cazaubon, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/029,460

(22) Filed: Feb. 17, 2011

(65) Prior Publication Data
US 2012/0211554 A1 Aug. 23, 2012

(51) Int. Cl.
G06F 17/00 (2006.01)
(52) U.S. Cl. .................. 235/375; 235/379; 235/487
(58) Field of Classification Search .............. 235/375, 235/487, 380, 379
See application file for complete search history.

(56) References Cited

U.S. PATENT DOCUMENTS

| 2009/0061934 | A1 | 3/2009 | Hauck et al. | |
| 2009/0109056 | A1* | 4/2009 | Tamarkin et al. | 340/870.02 |
| 2010/0029247 | A1 | 2/2010 | De Atley et al. | |
| 2010/0207721 | A1 | 8/2010 | Nakajima et al. | |

FOREIGN PATENT DOCUMENTS

| EP | 0913696 A2 | 6/1999 |
| EP | 0 992 958 A2 | 4/2000 |
| WO | 98/54583 A1 | 12/1998 |

OTHER PUBLICATIONS

New Zealand Office Action issued in connection with NZ Patent Application 598043, Feb. 15, 2012.
Office Action issued in connection with NZ Application No. 598043, Jun. 22, 2012.
Search Report issued in connection with EP Application No. 12153976.1, Jul. 23, 2012.

* cited by examiner

Primary Examiner — Karl D Frech
(74) Attorney, Agent, or Firm — Hoffman Warnick LLC; William Heinze

(57) ABSTRACT

A metering infrastructure having smart devices that utilize smart cards. An infrastructure having a plurality of smart devices is disclosed wherein each smart device is adapted to be controlled by a removable smart card, and wherein each removable smart card includes a computational platform capable of storing and executing program code and a set of application programs capable of being executed on the computational platform, wherein each of the set of application programs is implemented to control an aspect of an associated smart device into which the removable smart card is inserted.

20 Claims, 3 Drawing Sheets

METERING INFRASTRUCTURE SMART CARDS

BACKGROUND OF THE INVENTION

The present invention relates generally to managing a metering infrastructure, and more particularly for managing and controlling devices in a metering infrastructure using deployed smart cards.

Large scale smart infrastructures may incorporate a large number of smart devices. One such example is an Advanced Metering Infrastructure (AMI), which refers to systems that measure, collect and analyze energy usage, and interact with advanced devices such as electricity meters, gas meters, heat meters, cable meters and water meters, through various communication media either on request (on-demand) or on predefined schedules. These infrastructures include hardware, software, communications, consumer energy displays and controllers, customer associated systems, Meter Data Management (MDM) software, supplier and network distribution business systems, etc.

A typical AMI may include a significant number of smart devices (e.g., meters, supervisory control and data acquisition "SCADA" devices, routers, etc.) having advanced (i.e., "smart") functional capabilities implemented with some type of computational system. Because many of these devices are heterogeneous in nature, providing different functions, being manufactured by different suppliers, etc., implementing and managing the devices within such an infrastructure poses a significant challenge.

BRIEF DESCRIPTION OF THE INVENTION

In one aspect of the present invention, a smart card for use in a card controllable device within a metering infrastructure is disclosed, the smart card comprising: a computational platform capable of storing and executing program code; and a set of application programs having program code capable of being executed on the computational platform, wherein each of the set of application programs is implemented to control an aspect of an associated card controllable device into which the smart card is inserted.

In a further aspect, an advanced metering infrastructure (AMI) having a plurality of smart devices is disclosed, each smart device being adapted to be controlled by a removable smart card, wherein each removable smart card includes: a computational platform capable of storing and executing program code; and a set of application programs having program code capable of being executed on the computational platform, wherein each of the set of application programs is implemented to control an aspect of an associated smart device into which the removable smart card is inserted.

In still a further aspect, a card controllable device for use in a metering infrastructure is provided, the card controllable device comprising: a set of operational units; a slot for receiving a smart card, wherein the smart card includes: a computational platform capable of storing and executing program code; and a set of application programs having program code capable of being executed on the computational platform, wherein each of the set of application programs is implemented to control aspects of the set of operational units; and a card interface for providing a communication channel between the smart card and the set of operational units.

DETAILED DESCRIPTION OF THE INVENTION

Various embodiments of the present invention are directed to managing and controlling devices in a metering infrastructure using smart cards. For the purposes of this disclosure, the term "smart card" generally refers to any portable card, device or token that includes a computational platform, such as an embedded integrated circuit. Common examples include SIMs (subscriber identity modules) commonly found in cell phones and other network devices, chip cards such as those provided by Gemalto®, etc.

In a typical advanced metering infrastructure (AMI), computational functionality is implemented using software and firmware embedded within the different hardware devices that form the infrastructure. For example, each meter may include special purpose hardware programmed to perform certain functions, e.g., manage meter readings, implement communication and security protocols, handle subscriber identification, etc. Unfortunately, as noted above, this greatly limits the flexibility of the infrastructure, i.e., devices have to be manufactured, programmed and tested to meet rigorous specifications and protocols to ensure fluid operation.

Figure 1:
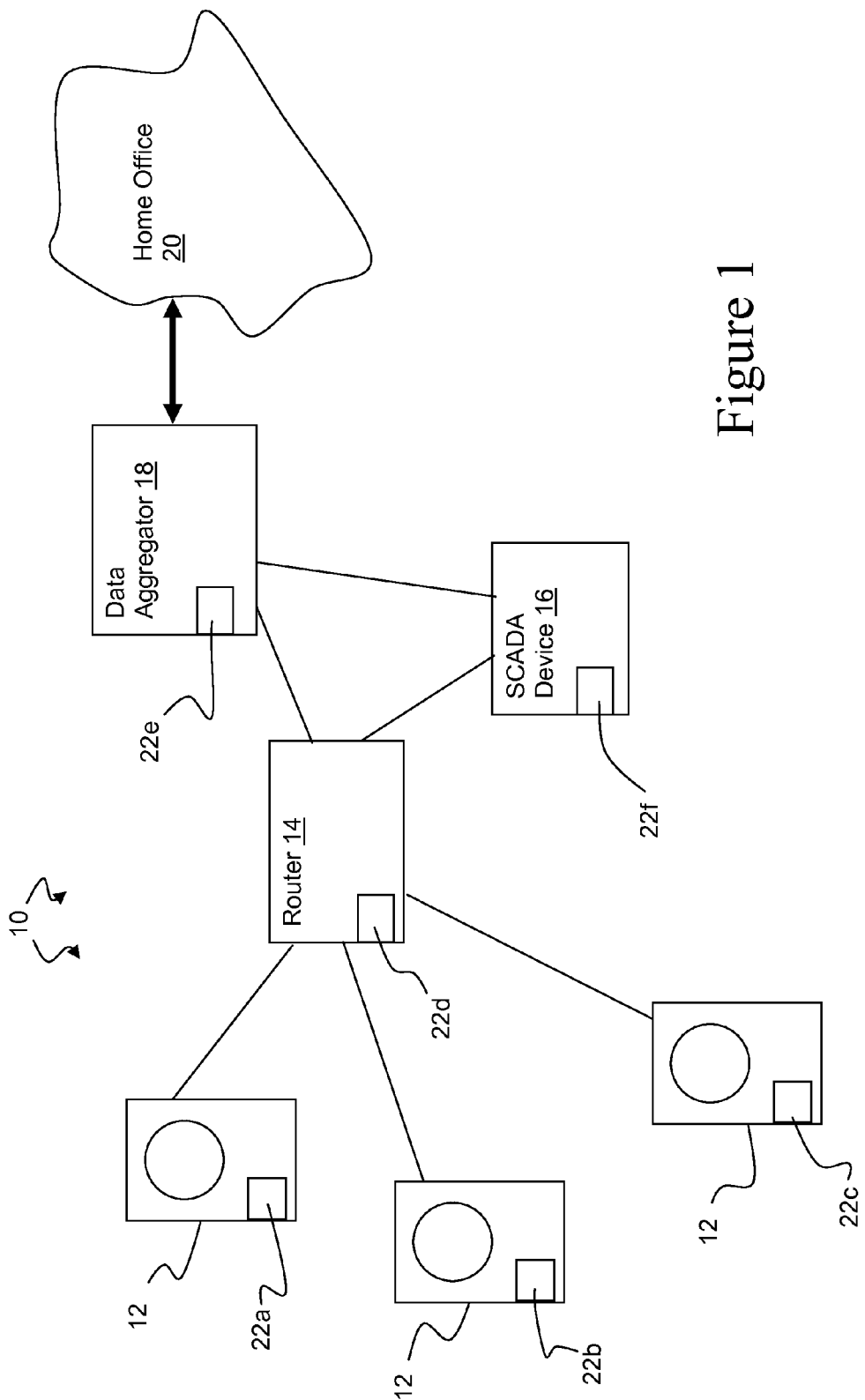
FIG. 1 is a schematic diagram illustrating an AMI being managed using smart cards according to one embodiment of the present invention.

Described herein is a more flexible approach to managing and controlling a smart infrastructure such as an AMI, in which computational functionality is moved from the hardware devices to portable smart cards. FIG. 1 depicts a schematic view of an AMI 10 having a plurality of smart devices, including smart meters 12, a router 14, a SCADA device 16 and a data aggregator 18. The smart devices form a network that is ultimately driven by a home office 20 via a back haul. Obviously, the depicted set of devices is intended to show a simple example of an AMI, and the type and number of devices can vary depending on the particular application.

Each smart device in the AMI 10 is equipped with a set of predefined functions that are controlled and/or implemented by a removable smart card 22*a-f*. Accordingly, some or all of the actual computational functionality is removed from each device and is implemented in the device's associated smart card 22*a-f*. As such, the "smart" features of the hardware devices do not need to be built into each device, but are instead located on an associated smart card 22*a-f*. Upon inserting an associated smart card (e.g., card 22*a*) into a device (e.g., meter 12), the smart functionality specific to the smart card becomes enabled on the device. Among other benefits, this approach allows for the mass production of "generic" card controllable devices that can customized via a smart card 22*a-f* for specific customers, desired functionality, locations, etc., simply by inserting a smart card that is programmed to the installation's specific functionality requirements. Upgrades and changes to hardware functionality can be achieved by simply changing or reprogramming the smart card 22*a-f*.

Figure 2:
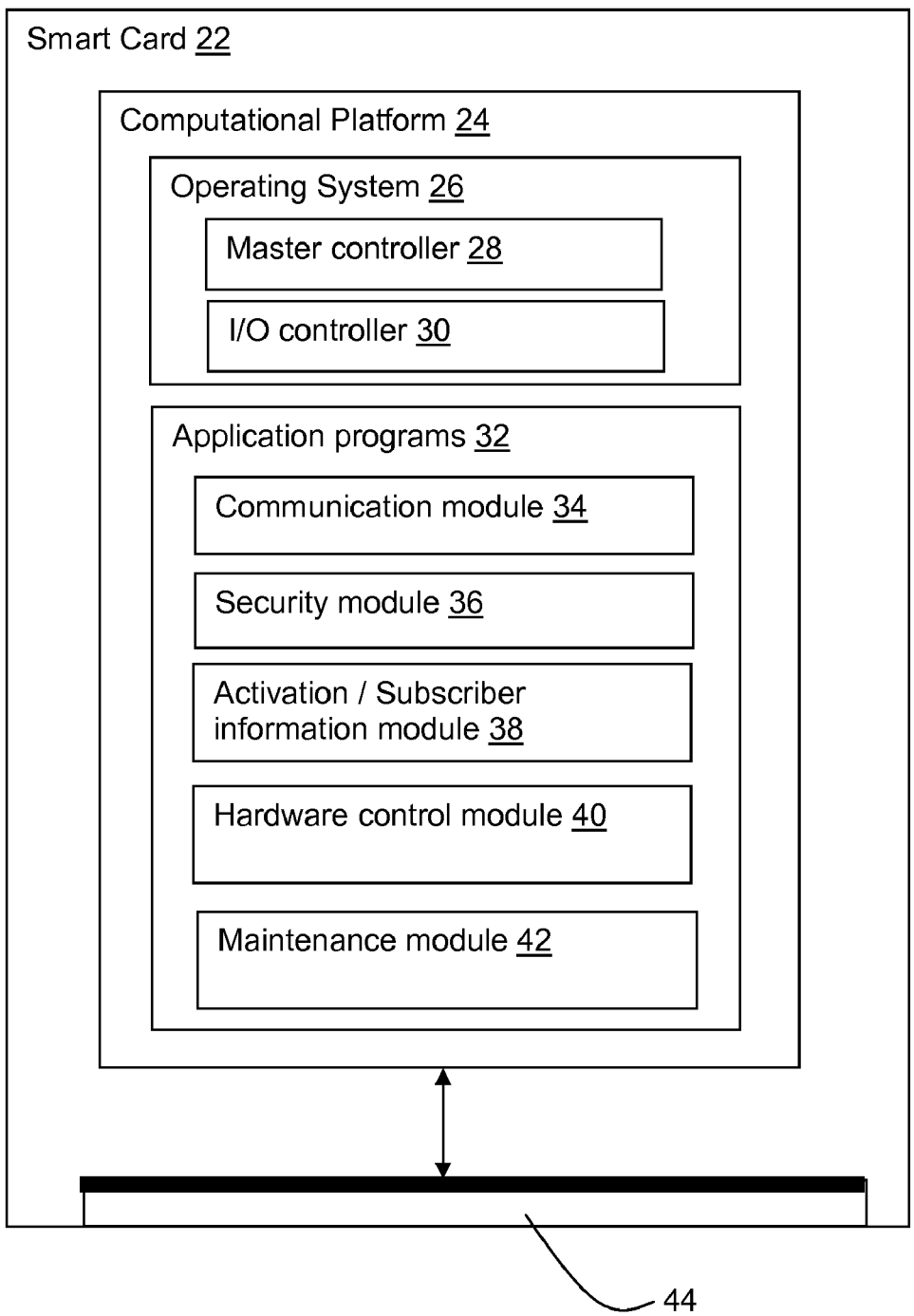
FIG. 2 is a schematic block diagram of a smart card according to one embodiment of the present invention.

FIG. 2 depicts an illustrative schematic of a smart card 22 having a computational platform 24. Computational platform 24 may for example be implemented via an integrated circuit (not shown) that includes a processor, memory, I/O, and bus. Within the computational platform 24 is an operating system 26, e.g., a Java Virtual Machine (JVM), having for instance a master controller 28 and an I/O controller. Master controller 28 facilitates the configuring and programming of the smart card 22, while I/O controller 30 facilitates communications with the associated hardware device via physical interface 44.

Also included within the computational platform 24 are a set of application programs 32 that perform functionality specific to the associated device into which the smart card 22 is inserted.

In this illustrative embodiment, application programs 32 include: (1) a communication module 34 for implementing communication protocols and methods (e.g., cellular, fiber, TCP/IP, etc.); (2) a security module 36 for implementing security protocols, establishing secure communications, providing encryption support, etc.; (3) an activation/subscriber information module 38 for activating an associated device, managing associated licenses, maintaining subscriber information, etc.; (4) a hardware control module 40 for controlling and managing actual device operations, e.g., scheduling and obtaining meter readings, relaying or retrieving readings over a network, etc.; and (5) a maintenance module 42 for handing errors, e.g., ensuring proper operation of the device, performing self tests, servicing problems, performing upgrades, etc. It is understood that the number and type of application programs 32 will depend upon the specific requirements of the associated hardware device.

It is understood that any type of computational platform 24/operating system 26 could be utilized, including, e.g., Java, .NET, C++, a proprietary system, an open system, etc. Operating systems such as Java allow application programs 32 written in Java to be securely protected and tamperproof, thus providing a high level of inherent security.

Accordingly, each of the application programs 32 are stored and executed within the smart card 22 itself, thus eliminating (or reducing) the need for a computational platform on the associated device. As such, most or all of the "smart" functionality is maintained and run on the smart card 22.

In one illustrative embodiment, the operating system 26 is automatically launched when the smart card 22 is inserted into an associated device and the device is powered on. The operating system 26 then launches master controller 28, which in turn launches one or more application programs 32, which may run continuously or be launched as needed. For example, the hardware control module 40 may continuously run to collect a continuous stream of meter data while the maintenance module 42 may be launched as needed to install upgrades or check for errors. I/O controller 30 is likewise launched by the operating system 26 to allow the smart card to talk to the associated device.

Figure 3:
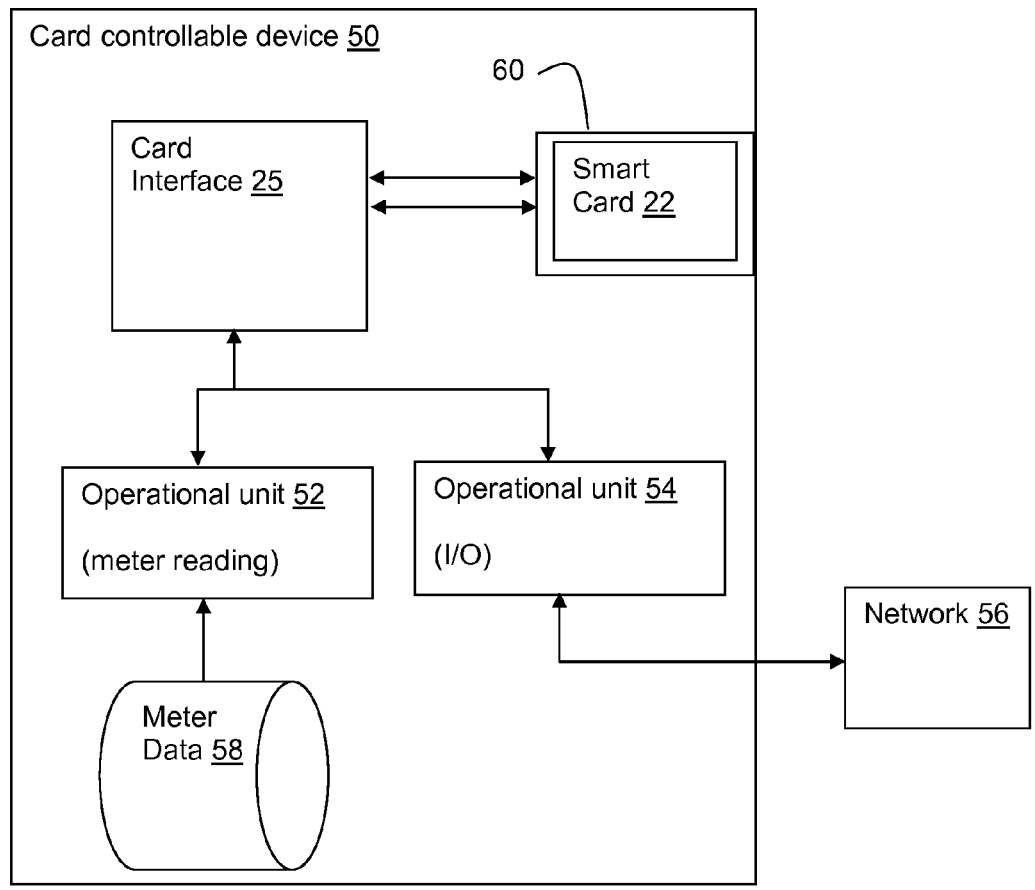
FIG. 3 shows a schematic diagram of a card controllable device according to one embodiment of the present invention.

FIG. 3 depicts an example of a card controllable device 50, such as a utility meter, configured for control by smart card 22. In this example, card controllable device 50 includes a physical slot 60 for receiving smart card 22. Smart card 22 can be inserted and removed as needed from physical slot 60 using a mechanical latch or the like. Also included is a card interface 25 that is configured to provide a communication channel between the inserted smart card 22 and one or more operational units 52, 54. For instance, card interface 25 may be adapted to receive instructions, data or control signals generated from applications running on the smart card 22, and relay the same to operational units 52, 54. Conversely, card interface 25 may also be adapted to relay data from the operational units 52, 54 to the smart card 22, where the data can be processed.

In this example, card controllable device 50 includes a first operational unit 52 for collecting meter data 58, e.g., power usage, error conditions, etc. Also included is a second operational unit 54 that provides input/output (I/O) functions to an associated network 56. Thus, for instance, smart card 22 may: (1) instruct operational unit 52 to collect meter readings every ten minutes, (2) store the readings in a temporary cache on the smart card 22, and (3) instruct operational unit 54 to transmit daily readings to the home office, e.g., at a predetermined time.

The technical effects include a metering infrastructure having a plurality of smart devices in which some or all of the smart devices are controlled and managed by smart cards that include a computation platform and application programs for implementing the smart functionality of an associated device.

In various embodiments of the present invention, aspects of the smart card 22 described herein can be implemented in the form of an entirely hardware embodiment, an entirely software embodiment or an embodiment containing both hardware and software elements. In one embodiment, the operating system 26 and application programs 32 (FIG. 2) may be implemented in software, which includes but is not limited to firmware, resident software, microcode, etc.

Furthermore, the processing functions can take the form of a computer program product accessible from a computer-usable or computer-readable medium providing program code for use by or in connection with a computer platform resident on the smart card 22 or any instruction execution system (e.g., processing units). For the purposes of this description, a computer-usable or computer readable medium can be any computer readable storage medium that can contain or store the program for use by or in connection with the computer, instruction execution system, apparatus, or device. In a further embodiment, a computer readable transmission medium may be utilized that can communicate, propagate or transport the program for use by or in connection with the computer, instruction execution system, apparatus, or device.

The computer readable medium can be an electronic, magnetic, optical, electromagnetic, infrared, or semiconductor system (or apparatus or device). Examples of a computer-readable medium include a semiconductor or solid state memory, a random access memory (RAM), a read-only memory (ROM), a rigid magnetic disk and an optical disk. Current examples of optical disks include a compact disk-read only memory (CD-ROM), a compact disk-read/write (CD-R/W) and a digital video disc (DVD).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A smart card for use in a card controllable device deployed within a metering infrastructure, the smart card comprising:
   a computational platform capable of storing and executing program code; and
   a set of application programs having program code capable of being executed on the computational platform, wherein each of the application programs is implemented to control an aspect of the card controllable device into which the smart card is inserted, wherein each of the application programs performs a predefined function assigned to the card controllable device that facilitates measurement, collection and analysis of energy usage and interaction with a utility meter by the metering infrastructure.

2. The smart card of claim 1, wherein the set of application programs includes a hardware control module for managing and processing data being collected from the utility meter.

3. The smart card of claim 1, wherein the set of application programs includes a communication module for managing communications between the card controllable device and a network.

4. The smart card of claim 1, wherein the set of application programs includes a security module for establishing a security protocol for data being collected, processed or communicated within or by the card controllable device.

5. The smart card of claim 1, wherein the set of application programs includes an activation/subscriber information module for activating the card controllable device and maintaining subscriber information.

6. The smart card of claim 1, wherein the set of application programs includes a maintenance module for handling errors occurring at the card controllable device and providing updates to the set of application programs in the smart card.

7. An advanced metering infrastructure (AMI) comprising a plurality of smart devices, each smart device being adapted to be controlled by a removable smart card, wherein each removable smart card includes:
   a computational platform capable of storing and executing program code; and
   a set of application programs having program code capable of being executed on the computational platform, wherein each of the application programs is implemented to control an aspect of an associated smart device into which the removable smart card is inserted, wherein each of the application programs performs a predefined function assigned to the associated smart device that facilitates measurement, collection and analysis of energy usage and interaction with a utility meter by the AMI.

8. The AMI of claim 7, wherein the set of application programs includes a hardware control module for managing and processing data being collected from the associated smart device.

9. The AMI of claim 7, wherein the set of application programs includes a communication module for managing communications between the associated smart device and a network.

10. The AMI of claim 7, wherein the set of application programs includes a security module for establishing a security protocol for data being collected, processed or communicated within or by the associated smart device.

11. The AMI of claim 7, wherein the set of application programs includes an activation/subscriber information module for activating the associated smart device and maintaining subscriber information.

12. The AMI of claim 7, wherein the set of application programs includes a maintenance module for handling errors occurring at the associated smart device and providing updates to the set of application programs in the removable smart card.

13. A card controllable device for use in a metering infrastructure, the card controllable device comprising:
   a set of operational units;
   a slot for receiving a smart card, wherein the smart card includes:
      a computational platform capable of storing and executing program code; and
      a set of application programs having program code capable of being executed on the computational platform, wherein each of the application programs is implemented to control aspects of the set of operational units, wherein each of the application programs causes each of the operational units to perform a predefined function assigned to the card controllable device that facilitates measurement, collection and analysis of energy usage and interaction with a utility meter by the metering infrastructure; and
   a card interface for providing a communication channel between the smart card and the set of operational units.

14. The card controllable device of claim 13, wherein the smart card includes:
   a first application program to receive and process meter data from a first operational unit; and
   a second application program to cause a second operational unit to transmit processed meter data over a network.

15. The card controllable device of claim 13, wherein the set of application programs includes a hardware control module for managing and processing data being collected from an operational unit.

16. The card controllable device of claim 13, wherein the set of application programs includes a communication module for managing communications between the card controllable device and a network.

17. The card controllable device of claim 13, wherein the set of application programs includes a security module for establishing a security protocol for data being collected, processed or communicated within or by the card controllable device.

18. The card controllable device of claim 13, wherein the set of application programs includes an activation/subscriber information module for activating the card controllable device and maintaining subscriber information.

19. The card controllable device of claim 13, wherein the set of application programs includes a maintenance module for handling errors occurring at the card controllable device and providing updates to the set of application programs in the smart card.

20. The card controllable device of claim 13, wherein the card controllable device is selected from a group consisting of: a meter, a supervisory control and data acquisition (SCADA) device, a router, and a data aggregator.

* * * * *